United States Patent
Wang et al.

(10) Patent No.: US 12,542,416 B2
(45) Date of Patent: Feb. 3, 2026

(54) HIGH-RELIABILITY LOW-DEFECT SEMICONDUCTOR LIGHT-EMITTING DEVICE AND METHOD FOR MANUFACTURING SAME

(71) Applicants: SUZHOU EVERBRIGHT PHOTONICS CO., LTD., Jiangsu (CN); EVERBRIGHT INSTITUTE OF SEMICONDUCTOR PHOTONICS CO., LTD., Jiangsu (CN)

(72) Inventors: Jun Wang, Suzhou (CN); Shaoyang Tan, Suzhou (CN); Lichen Zhang, Suzhou (CN); Yiwen Hu, Suzhou (CN); Wu Zhao, Suzhou (CN); Bo Li, Suzhou (CN); Quanling Li, Suzhou (CN)

(73) Assignees: Suzhou Everbright Photonics Co., Ltd. (CN); EVERBRIGHT INSTITUTE OF SEMICONDUCTOR PHOTONICS CO., LTD. (CN)

( * ) Notice: Subject to any disclaimer, the term of this patent is extended or adjusted under 35 U.S.C. 154(b) by 0 days.

(21) Appl. No.: 17/924,291

(22) PCT Filed: Jul. 20, 2022

(86) PCT No.: PCT/CN2022/106853
§ 371 (c)(1),
(2) Date: Nov. 9, 2022

(87) PCT Pub. No.: WO2023/165072
PCT Pub. Date: Sep. 7, 2023

(65) Prior Publication Data
US 2024/0222931 A1 Jul. 4, 2024

(30) Foreign Application Priority Data
Mar. 4, 2022 (CN) .......................... 202210205786.5

(51) Int. Cl.
*H01S 5/042* (2006.01)
*H01S 5/20* (2006.01)

(52) U.S. Cl.
CPC ........ *H01S 5/0421* (2013.01); *H01S 5/04254* (2019.08); *H01S 5/2018* (2013.01);
(Continued)

(58) Field of Classification Search
CPC ............... H01S 5/0421; H01S 5/04254; H01S 5/04256; H01S 5/2086; H01S 5/209; H01S 5/2018
See application file for complete search history.

(56) References Cited

U.S. PATENT DOCUMENTS

| 5,432,810 A | 7/1995 | Nakayama | |
| 5,617,446 A * | 4/1997 | Ishibashi | H10H 20/816 |
| | | | 257/E33.07 |

(Continued)

FOREIGN PATENT DOCUMENTS

| CN | 101373804 A | 2/2009 |
| CN | 101681959 A | 3/2010 |

(Continued)

OTHER PUBLICATIONS

European Patent Office; Extended European Search Report issued in EP App. 22808568.4 dated Nov. 21, 2023; 12 pages.

(Continued)

*Primary Examiner* — James A Menefee
(74) *Attorney, Agent, or Firm* — MASCHOFF BRENNAN

(57) ABSTRACT

A high-reliability low-defect semiconductor light-emitting device and a method for manufacturing same. The high-reliability low-defect semiconductor light-emitting device includes: a semiconductor substrate layer; an active layer arranged on the semiconductor substrate layer; a doped (Continued)

semiconductor contact layer arranged on a side of the active layer away from the semiconductor substrate layer, where the doped semiconductor contact layer includes a first area and an edge area surrounding the first area; a protection layer arranged on a side of the edge area of the doped semiconductor contact layer away from the active layer; and a front electrode layer, arranged on a side of the first area away from the active layer, where an upper surface of the front electrode layer in the first area is lower than an upper surface of the protection layer. The semiconductor light-emitting device has both high reliability and reduced process control costs.

20 Claims, 3 Drawing Sheets

(52) U.S. Cl.
CPC ........ *H01S 5/2086* (2013.01); *H01S 5/04256* (2019.08); *H01S 5/209* (2013.01)

(56) References Cited

U.S. PATENT DOCUMENTS

| | | | |
|---|---|---|---|
| 6,795,466 B1* | 9/2004 | Takei | H01S 5/1231 |
| | | | 372/102 |
| 7,272,161 B1* | 9/2007 | Chen | H01S 5/22 |
| | | | 372/43.01 |
| 2002/0081763 A1* | 6/2002 | Ishibashi | H01L 21/02458 |
| | | | 438/32 |
| 2002/0167982 A1* | 11/2002 | Schmidt | H01S 5/22 |
| | | | 372/46.01 |
| 2003/0124756 A1* | 7/2003 | Garabedian | H01S 5/22 |
| | | | 438/46 |
| 2003/0194823 A1 | 10/2003 | Miyazaki et al. | |
| 2004/0079994 A1* | 4/2004 | Ueda | H01L 21/0237 |
| | | | 257/E21.119 |
| 2004/0113160 A1 | 6/2004 | Oshima | |
| 2005/0141579 A1 | 6/2005 | Yamane et al. | |
| 2005/0190416 A1 | 9/2005 | Yoneda | |
| 2005/0199876 A1 | 9/2005 | Hiroshi et al. | |
| 2006/0011946 A1 | 1/2006 | Toda et al. | |
| 2009/0039364 A1 | 2/2009 | Kang et al. | |
| 2009/0267187 A1 | 10/2009 | Hose et al. | |
| 2010/0065872 A1 | 3/2010 | Lee | |
| 2010/0226403 A1* | 9/2010 | Obata | H01S 5/0421 |
| | | | 372/45.011 |
| 2010/0303115 A1* | 12/2010 | Yagi | H01S 5/2231 |
| | | | 438/31 |
| 2012/0213242 A1 | 8/2012 | Tanaka et al. | |
| 2017/0079102 A1* | 3/2017 | Simin | H01S 5/0421 |
| 2019/0221999 A1 | 7/2019 | Kawakami et al. | |

FOREIGN PATENT DOCUMENTS

| | | |
|---|---|---|
| CN | 101764355 A | 6/2010 |
| CN | 103928324 A | 7/2014 |
| CN | 104577711 A | 4/2015 |
| CN | 104854765 A | 8/2015 |
| CN | 208874056 U | 5/2019 |
| CN | 114336268 A | 4/2022 |
| EP | 3012870 A1 | 4/2016 |
| JP | S48-6221 | 1/1973 |
| JP | S4994292 A | 9/1974 |
| JP | H05 63289 A | 3/1993 |
| JP | H 7-7220 A | 1/1995 |
| JP | 2001-185758 A | 7/2001 |
| JP | 2001257423 A | 9/2001 |
| JP | 2001332747 A | 11/2001 |
| JP | 2004-319912 A | 11/2004 |
| JP | 2005-191209 A | 7/2005 |
| JP | 2006-511948 A | 4/2006 |
| JP | 2007-227832 A | 9/2007 |
| JP | 2014-3229 A | 1/2014 |
| WO | 2003/075425 | 9/2003 |
| WO | 2004/059808 A2 | 7/2004 |

OTHER PUBLICATIONS

Japan Patent Office; Notice of Reasons for Refusal issued in JP App. No. 2022-579921 dated Mar. 12, 2024; 13 pages.
China National Intellectual Proerty Adminstration; International Search Report and Written Opinion issued in Int'l App. No. PCT/CN2022/106853 dated Nov. 17, 2022; 14 pages.
China National Intellectual Proerty Adminstration; First Office Action dated Apr. 19, 2022 issued in CN App. No. 202210205786.5, 17 pages.

* cited by examiner

HIGH-RELIABILITY LOW-DEFECT SEMICONDUCTOR LIGHT-EMITTING DEVICE AND METHOD FOR MANUFACTURING SAME

This application claims priority to Chinese patent application No. 202210205786.5, entitled "HIGH-RELIABILITY LOW-DEFECT SEMICONDUCTOR LIGHT-EMITTING DEVICE AND METHOD FOR MANUFACTURING SAME", filed with the China National Intellectual Property Administration on Mar. 4, 2022, the disclosure of which is hereby incorporated by reference in its entirety.

TECHNICAL FIELD

The present application relates to the field of semiconductor technologies, and specifically to a high-reliability low-defect semiconductor light-emitting device and a method for manufacturing same.

BACKGROUND

A semiconductor light-emitting device is a device that produces excited emission by using a certain semiconductor material as a working material. The working principle of the device is implementing particle number inversion of non-equilibrium carriers between energy bands (conduction bands and valence bands) of a semiconductor material or between an energy band of a semiconductor material and an energy level of an impurity (an acceptor or a donor) through certain excitation. Excited emission is produced when a large number of electrons and holes in a particle number inversion state recombine. Semiconductor light-emitting devices are widely used because of small sizes and high electro-optical conversion efficiency.

Existing technologies of mitigating defects on the surface of a semiconductor light-emitting device can hardly simultaneously improve reliability and reduce process control costs.

SUMMARY OF THE INVENTION

Therefore, a technical problem to be resolved by the present application is to overcome the problem that existing technologies can hardly simultaneously improve reliability and reduce process control costs, and a high-reliability low-defect semiconductor light-emitting device and a method for manufacturing same are provided.

The present application provides a high-reliability low-defect semiconductor light-emitting device, including: a semiconductor substrate layer; an active layer arranged on the semiconductor substrate layer; a doped semiconductor contact layer arranged on a side of the active layer away from the semiconductor substrate layer, where the doped semiconductor contact layer includes a first area and an edge area surrounding the first area; a protection layer arranged on a side of the edge area of the doped semiconductor contact layer away from the active layer; and a front electrode layer, arranged on a side of the first area away from the active layer, where an upper surface of the front electrode layer in the first area is lower than an upper surface of the protection layer.

Optionally, a height difference between the upper surface of the protection layer and the upper surface of the front electrode layer arranged in the first area ranges from 0.05 μm to 5 μm.

Optionally, a thickness of the protection layer in a direction perpendicular to a surface of the semiconductor substrate layer ranges from 0.1 μm to 5 μm.

Optionally, the high-reliability low-defect semiconductor light-emitting device has a front cavity surface and a rear cavity surface that are disposed opposite, and both the front cavity surface and the rear cavity surface expose a sidewall surface of the active layer and a sidewall surface of the doped semiconductor contact layer; and the protection layer includes a first sub-protection area and a second sub-protection area that are disposed oppositely, the first sub-protection area and the second sub-protection area are arranged along a light emission direction, an outer sidewall of the first sub-protection area is aligned with the sidewall surface of the active layer exposed from the front cavity surface and the sidewall surface of the doped semiconductor contact layer exposed from the front cavity surface, and an outer sidewall of the second sub-protection area is aligned with the sidewall surface of the active layer exposed from the rear cavity surface and the sidewall surface of the doped semiconductor contact layer exposed from the rear cavity surface.

Optionally, a material of the doped semiconductor contact layer is a first bulk semiconductor material doped with first conductive ions; and a material of the protection layer is an undoped second bulk semiconductor material, or a material of the protection layer is a second bulk semiconductor material doped with second conductive ions, where a conductivity type of the second conductive ions is opposite to a conductivity type of the first conductive ions; or a material of the protection layer is a second bulk semiconductor material doped with second conductive ions, a conductivity type of the second conductive ions is the same as a conductivity type of the first conductive ions, and a doping concentration of the second conductive ions is less than a doping concentration of the first conductive ions.

When the conductivity type of the second conductive ions is the same as the conductivity type of the first conductive ions, the doping concentration of the second conductive ions is $10^{-6}$ to $10^{-1}$ times the doping concentration of the first conductive ions.

Optionally, an average lattice mismatch between the second bulk semiconductor material and the first bulk semiconductor material is less than or equal to 1%.

Optionally, the second bulk semiconductor material is the same as the first bulk semiconductor material.

Optionally, the protection layer is a single-layer structure or a multilayer structure.

Optionally, when the semiconductor substrate layer is a GaAs substrate, the material of the protection layer is doped or undoped GaAs, or the material of the protection layer is doped or undoped AlGaAs, or the material of the protection layer is doped or undoped InGaP, or the material of the protection layer is doped or undoped InGaAsP, or the material of the protection layer is doped or undoped InGaAs; when a material of the semiconductor substrate layer is an InP substrate, the material of the protection layer is doped or undoped InGaAsP, or the material of the protection layer is doped or undoped InGaAlAs, or the material of the protection layer is doped or undoped InGaAs, or the material of the protection layer is doped or undoped InAlAs, or the material of the protection layer is doped or undoped InP; and when a material of the semiconductor substrate layer is a GaN substrate, the material of the protection layer is doped or undoped AlGaN, or the material of the protection layer is doped or undoped GaN, or the material of the protection layer is doped or undoped InAlGaN.

Optionally, the front electrode layer is further arranged on a side of the protection layer away from the doped semiconductor contact layer; and the high-reliability low-defect semiconductor light-emitting device further includes: a current-limiting insulating layer, where the current-limiting insulating layer is arranged between the front electrode layer above the protection layer and the protection layer and on a side of an edge of the first area away from the active layer.

Optionally, the doped semiconductor contact layer includes a first sub-doped semiconductor layer and a second sub-doped semiconductor layer arranged on a surface of the first sub-doped semiconductor layer on a side away from the active layer, and a doping concentration of the second sub-doped semiconductor layer is greater than a doping concentration of the first sub-doped semiconductor layer.

Optionally, the doping concentration of the second sub-doped semiconductor layer is 10 times to 50 times the doping concentration of the first sub-doped semiconductor layer.

Optionally, the device further includes: an upper waveguide layer arranged between the doped semiconductor contact layer and the active layer; an upper confining layer arranged between the upper waveguide layer and the doped semiconductor contact layer; a lower waveguide layer arranged between the active layer and the semiconductor substrate layer, and a lower confining layer arranged between the lower waveguide layer and the semiconductor substrate layer; and a back electrode layer arranged on a surface of the semiconductor substrate layer on a side away from the active layer.

The present application further provides a method for manufacturing a high-reliability low-defect semiconductor light-emitting device, including: providing a semiconductor substrate layer; forming an active layer on the semiconductor substrate layer; forming a doped semiconductor contact layer on a side of the active layer away from the semiconductor substrate layer, where the doped semiconductor contact layer includes a first area and an edge area surrounding the first area; forming a protection layer on a side of the edge area of the doped semiconductor contact layer away from the active layer; and forming a front electrode layer on a side of the first area away from the active layer, where an upper surface of the front electrode layer in the first area is lower than an upper surface of the protection layer.

Optionally, the step of forming a protection layer includes: epitaxially growing an initial protection layer on the side of the first area and the side of the edge area that are away from the active layer; and etching away a portion of the initial protection layer in the first area to form the protection layer that exposes a surface of the first area.

Optionally, the doped semiconductor contact layer and the initial protection layer are sequentially formed in the same epitaxial process.

Optionally, before the forming a front electrode layer, a current-limiting insulating layer is formed, and the current-limiting insulating layer is arranged on a side of the protection layer away from the active layer and a side of an edge part of the first area; and in the step of forming a front electrode layer, the front electrode layer is also formed on a side of the current-limiting insulating layer away from the protection layer.

Optionally, the step of forming a doped semiconductor contact layer includes: forming a first sub-doped semiconductor layer on the side of the active layer away from the semiconductor substrate layer; and forming a second sub-doped semiconductor layer on a surface of the first sub-doped semiconductor layer on a side away from the active layer, where a doping concentration of the second sub-doped semiconductor layer is greater than a doping concentration of the first sub-doped semiconductor layer.

Optionally, before the forming a front electrode layer, a plurality of first areas are provided, and cutting zones are provided between edge areas that surround different first areas; and the method for manufacturing a high-reliability low-defect semiconductor light-emitting device further includes: cleaving the front electrode layer, the current-limiting insulating layer, the protection layer, the doped semiconductor contact layer, the active layer, and the semiconductor substrate layer along the cutting zones.

The technical solutions of the present application have the following beneficial effects.

The high-reliability low-defect semiconductor light-emitting device provided in the technical solutions of the present application includes a protection layer. The protection layer is arranged on a side of the edge area of the doped semiconductor contact layer away from the active layer. The protection layer is used for raising the edge area of the doped semiconductor contact layer. In this way, an upper surface of the front electrode layer in the first area is lower than an upper surface of the protection layer. The upper surface of the front electrode layer in the first area is lower than the upper surface of the protection layer, and the protection layer protects the front electrode layer in the first area. Therefore, the protection layer can avoid scratch and contamination defects due to an external force in a project of manufacturing a semiconductor light-emitting device. Next, the introduction of the protection layer increases a distance between the front electrode layer and the active layer on the protection layer. This greatly reduces the impact of cleavage defects generated in a cavity surface and a side surface of the semiconductor light-emitting device on the active layer. Even if a small amount of the material of the front electrode layer extends to a part of the cavity surface of the semiconductor light-emitting device, the presence of the protection layer can prevent the material of the front electrode layer from extending to the active layer. This reduces the blockage of a coating on the cavity surface by the material of the front electrode layer, thereby reducing catastrophic optical damage to the cavity surface. In summary, the reliability of the semiconductor light-emitting device is improved. Next, it is relatively easy to arrange the protection layer, the technical difficulty is reduced, and the costs are relatively low.

Optionally, when the conductivity type of the second conductive ions is opposite to the conductivity type of the first conductive ions, in this way, electrical isolation is formed between the doped semiconductor contact layer and the protection layer, so that a current in the edge area of the doped semiconductor contact layer is limited. When the conductivity type of the second conductive ions is the same as the conductivity type of the first conductive ions, because the doping concentration of the second conductive ions is less than the doping concentration of the first conductive ions, the protection layer is not easily conductive, and the protection layer limits the current in the edge area of the doped semiconductor contact layer to some extent.

Optionally, the doping concentration of the second conductive ions is $10^{-6}$ to $10^{-1}$ times the doping concentration of the first conductive ions. In this way, the protection layer provides additional electrical insulation, so that the current in the edge area of the doped semiconductor contact layer is limited by both the current-limiting insulating layer and the protection layer.

Optionally, a material of the doped semiconductor contact layer is a first bulk semiconductor material doped with first conductive ions; and a material of the protection layer is an undoped second bulk semiconductor material, or a material of the protection layer is a second bulk semiconductor material doped with second conductive ions. An average lattice mismatch between the second bulk semiconductor material and the first bulk semiconductor material is less than or equal to 1%. In this way, stress at an interface between the doped semiconductor contact layer and the protection layer is reduced, and a lattice match at the interface between the doped semiconductor contact layer and the protection layer is high, so that the protection layer is easily formed on the doped semiconductor contact layer.

Optionally, the doped semiconductor contact layer includes a first sub-doped semiconductor layer and a second sub-doped semiconductor layer arranged on a surface of the first sub-doped semiconductor layer on a side away from the active layer, and a doping concentration of the second sub-doped semiconductor layer is greater than a doping concentration of the first sub-doped semiconductor layer. Because the doping concentration of the second sub-doped semiconductor layer is relatively high, the contact resistance between the second sub-doped semiconductor layer and the front electrode layer is reduced. Because the doping concentration of the first sub-doped semiconductor layer is relatively low and the second sub-doped semiconductor layer is far away from the active layer compared with the first sub-doped semiconductor layer, the impact of the doped ions in the doped semiconductor contact layer on absorption loss of light emitted by the active layer is reduced.

In the method for manufacturing a high-reliability low-defect semiconductor light-emitting device provided in the technical solutions of the present application, a protection layer is formed on a side of the edge area of the doped semiconductor contact layer away from the active layer. The protection layer is used for raising the edge area of the doped semiconductor contact layer. In this way, an upper surface of the front electrode layer in the first area is lower than an upper surface of the protection layer. The upper surface of the front electrode layer in the first area is lower than the upper surface of the protection layer, and the protection layer protects the front electrode layer in the first area. Therefore, the protection layer can avoid scratch and contamination defects due to an external force in a project of manufacturing a semiconductor light-emitting device. Next, the introduction of the protection layer increases a distance between the front electrode layer and the active layer on the protection layer. This greatly reduces the impact of cleavage defects generated in a cavity surface and a side surface of the semiconductor light-emitting device on the active layer. Even if a small amount of the material of the front electrode layer extends to a part of the cavity surface of the semiconductor light-emitting device, the presence of the protection layer can prevent the material of the front electrode layer from extending to the active layer. This reduces the blockage of a coating on the cavity surface by the material of the front electrode layer, thereby reducing catastrophic optical damage to the cavity surface. In summary, the reliability of the semiconductor light-emitting device is improved. Next, it is relatively easy to arrange the protection layer, the technical difficulty is reduced, and the costs are relatively low.

Optionally, the doped semiconductor contact layer and the initial protection layer are sequentially formed in the same epitaxial process, so that the process is simplified. The doped semiconductor contact layer and the initial protection layer are continuously formed. In this way, the introduction of defects between the doped semiconductor contact layer and the initial protection layer is avoided, so that defects between the protection layer and the edge area of the doped semiconductor contact layer are reduced. In this way, the impact on carrier mobility is avoided, thereby preventing the resistance and voltage of the device from rising.

Optionally, even if defects exist in the upper surface of the protection layer before the current-limiting insulating layer is formed and a lamination fault sheet is generated in a process of forming the current-limiting insulating layer on the protection layer, the electrical isolation of the protection layer can prevent the current-limiting insulating layer from breakdown due to increased charges, thereby keeping the semiconductor light-emitting device from reduced aging life or leakage and burnout.

BRIEF DESCRIPTION OF THE DRAWINGS

To describe the technical solutions in specific embodiments of the present application or the prior art more clearly, the following briefly introduces the accompanying drawings required for describing the specific embodiments or the prior art. Apparently, the accompanying drawings in the following description show some embodiments of the present application, and a person of ordinary skill in the art may still derive other drawings from these accompanying drawings without creative efforts.

DETAILED DESCRIPTION

Figure 1:
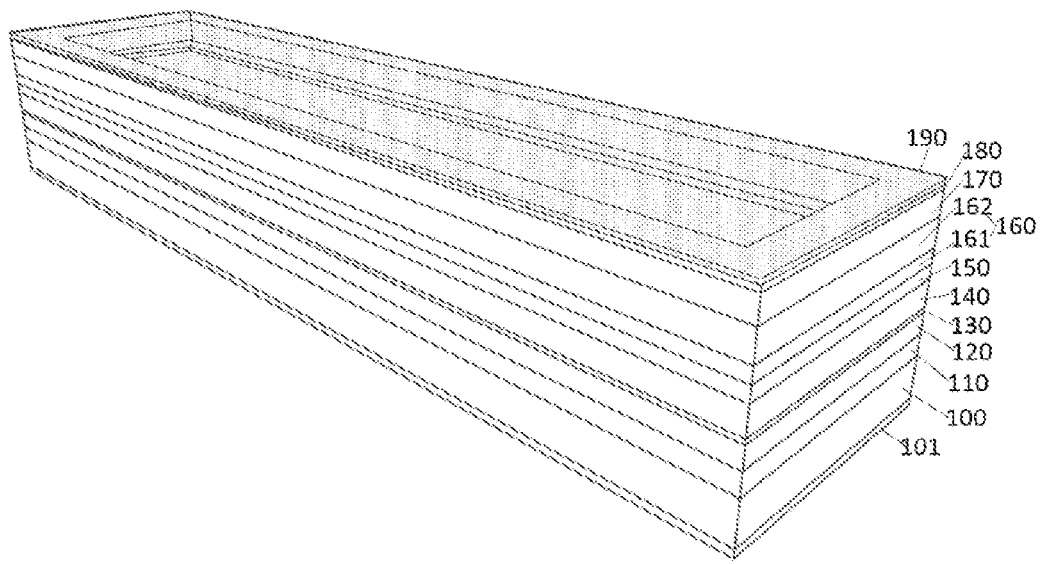
FIG. 1 is a schematic structural diagram of a high-reliability low-defect semiconductor light-emitting device according to an embodiment of the present application.

As the market and applications of high-power semiconductor light-emitting devices keep expanding, users' requirements for high reliability performance and cost reduction prompt manufacturers to pay more attention to the failure resistance of high-power semiconductor light-emitting devices during long-term operation. Failure of semiconductor light-emitting devices is usually caused by contamination or scratch defects introduced on the surface of a wafer in a process preparation process or packaging process as well as cleavage defects near the surface of a cavity surface of a chip in a cleavage coating and packaging process of the chip. The defects on the surface lead to a lamination fault sheet in a deposition process of a dielectric film. For example, if such anomalies occur near a light-emitting area, the carrier mobility is affected, leading to increased resistance and voltage of the device, or charges in a dielectric layer are increased, causing a dielectric breakdown phenomenon. As a result, the aging life of semiconductor light-emitting devices is reduced or leakage burnout occurs. The defects on the surface of the wafer also lead to packaging defects in a current injection area of the chip to cause high local temperature of the chip and high stress, and failure of an active material is caused. Cleavage defects near the surface of a cavity surface and a side surface lead to catastrophic damage to the cavity surface, causing bypass leakage and burnout in a packaging process. Therefore, device reliability is usually enhanced by strict process control of epitaxial growth adjustment, wafer preparation, and cavity surface coating and packaging. However, these technologies bring defects such as technical complexity, reduced process stability, and increased process production costs.

The following clearly and completely describes the technical solutions in the present application with reference to the accompanying drawings. Apparently, the described embodiments are some rather than all of the embodiments of the present application. All other embodiments obtained by persons of ordinary skill in the art based on the embodiments of the present application without creative efforts shall fall within the protection scope of the present application.

In the description of the present application, it needs to be understood that orientation or location relationships indicated by terms "center", "up", "down", "left", "right", "vertical", "horizontal", "inside", and "outside" are based on orientation or location relationships shown in the accompanying drawings, and are only used to facilitate description of the present application and simplify description, but are not used to indicate or imply that the apparatuses or elements must have specific orientations or are constructed and operated by using specific orientations, and therefore, cannot be understood as a limit to the present application. In addition, the terms "first", "second", and "third" are used only for description, but are not intended to indicate or imply relative importance.

In addition, the technical features involved in different embodiments of the present application described below can be combined with each other as long as they do not constitute a conflict between them.

Embodiment 1

An embodiment of the present application provides a high-reliability low-defect semiconductor light-emitting device, referring to FIG. 1. including:
 a semiconductor substrate layer 100;
 an active layer 130 arranged on the semiconductor substrate layer;
 a doped semiconductor contact layer 160 arranged on a side of the active layer 130 away from the semiconductor substrate layer 100, where the doped semiconductor contact layer 160 includes a first area and an edge area surrounding the first area;
 a protection layer 170 arranged on a side of the edge area of the doped semiconductor contact layer 160 away from the active layer 130; and
 a front electrode layer 190, arranged on a side of the first area away from the active layer 130, where an upper surface of the front electrode layer 190 in the first area is lower than an upper surface of the protection layer 170.

In this embodiment, the protection layer 170 is used for raising the edge area of the doped semiconductor contact layer 160. In this way, an upper surface of the front electrode layer 190 in the first area is lower than an upper surface of the protection layer 170. The upper surface of the front electrode layer 190 in the first area is lower than the upper surface of the protection layer 170, and the protection layer protects the front electrode layer 190 in the first area. Therefore, the protection layer 170 can avoid scratch and contamination defects due to an external force in a project of manufacturing a semiconductor light-emitting device. Next, the introduction of the protection layer 170 increases a distance between the front electrode layer 190 and the active layer on the protection layer 170. This greatly reduces the impact of cleavage defects generated in a cavity surface and a side surface of the semiconductor light-emitting device on the active layer. Even if a small amount of the material of the front electrode layer 190 extends to a part of the cavity surface of the semiconductor light-emitting device, the presence of the protection layer 170 can prevent the material of the front electrode layer 190 from extending to the active layer 130. This reduces the blockage of a coating on the cavity surface by the material of the front electrode layer 190, thereby reducing catastrophic optical damage to the cavity surface. In summary, the reliability of the semiconductor light-emitting device is improved. Next, it is relatively easy to arrange the protection layer 170, the technical difficulty is reduced, and the costs are relatively low.

In an embodiment, a height difference between the upper surface of the protection layer 170 and the upper surface of the front electrode layer 190 arranged in the first area ranges from 0.05 μm to 5 μm, and is, for example, 0.05 μm, 0.1 μm, 0.5 μm, 2 μm, 3 μm, 4 μm or 5 μm. If the height difference between the upper surface of the protection layer 170 and the upper surface of the front electrode layer 190 arranged in the first area is less than 0.05 μm, the protection layer 170 provides little protection for the first area and the active layer 130. If the height difference between the upper surface of the protection layer 170 and the upper surface of the front electrode layer 190 arranged in the first area is greater than 5 μm, the height of the semiconductor light-emitting device is excessively large, which is not conducive to miniaturization.

In an embodiment, a thickness of the protection layer 170 in a direction perpendicular to a surface of the semiconductor substrate layer 100 ranges from 0.1 μm to 5 μm, and is, for example, 0.1 μm, 0.5 μm, 2 μm, 3 μm, 4 μm or 5 μm. If the thickness of the protection layer 170 in the direction perpendicular to the surface of the semiconductor substrate layer 100 is excessively small, the protection layer 170 provides little protection for the first area and the active layer 130. If the thickness of the protection layer 170 in the direction perpendicular to the surface of the semiconductor substrate layer 100 is excessively large, the height of the semiconductor light-emitting device is excessively large, which is not conducive to miniaturization.

The protection layer 170 is an annular structure. The protection layer 170 is not disposed above the first area.

The high-reliability low-defect semiconductor light-emitting device has a front cavity surface and a rear cavity surface that are disposed opposite, and both the front cavity surface and the rear cavity surface expose a sidewall surface of the active layer 130 and a sidewall surface of the doped semiconductor contact layer 160; and the protection layer 170 includes a first sub-protection area and a second sub-protection area that are disposed oppositely, the first sub-protection area and the second sub-protection area are arranged along a light emission direction, an outer sidewall of the first sub-protection area is aligned with the sidewall surface of the active layer 130 exposed from the front cavity surface and the sidewall surface of the doped semiconductor contact layer 160 exposed from the front cavity surface, and an outer sidewall of the second sub-protection area is aligned with the sidewall surface of the active layer 130 exposed from the rear cavity surface and the sidewall surface of the doped semiconductor contact layer 160 exposed from the rear cavity surface.

The protection layer 170 further includes a third sub-protection area and a fourth sub-protection area that are disposed oppositely. The third sub-protection area is respectively connected to the first sub-protection area and the second sub-protection area. The fourth sub-protection area is respectively connected to the first sub-protection area and the second sub-protection area.

A material of the protection layer 170 is an undoped second bulk semiconductor material, or a material of the protection layer 170 is a second bulk semiconductor material doped with second conductive ions, where a conductivity type of the second conductive ions is opposite to a conductivity type of the first conductive ions; or a material of the protection layer 170 is a second bulk semiconductor material doped with second conductive ions, a conductivity type of the second conductive ions is the same as a conductivity type of the first conductive ions, and a doping concentration of the second conductive ions is less than a doping concentration of the first conductive ions.

When the conductivity type of the second conductive ions is opposite to the conductivity type of the first conductive ions, in this way, electrical isolation is formed between the doped semiconductor contact layer 160 and the protection layer 170, so that a current in the edge area of the doped semiconductor contact layer 160 is limited. In a specific embodiment, the conductivity type of the doped semiconductor contact layer 160 is an N type, and the conductivity type of the protection layer 170 is a P type.

When the conductivity type of the second conductive ions is the same as the conductivity type of the first conductive ions, because the doping concentration of the second conductive ions is less than the doping concentration of the first conductive ions, the protection layer 170 is not easily conductive, and the protection layer 170 limits the current in the edge area of the doped semiconductor contact layer 160 to some extent.

An average lattice mismatch between the second bulk semiconductor material and the first bulk semiconductor material is less than or equal to 1%. In this way, stress at an interface between the doped semiconductor contact layer 160 and the protection layer 170, and a lattice match at the interface between the doped semiconductor contact layer 160 and the protection layer 170 is high, so that the protection layer 170 is easily formed on the doped semiconductor contact layer.

Further, in an embodiment, the second bulk semiconductor material is the same as the first bulk semiconductor material. The same bulk semiconductor material is used for the doped semiconductor contact layer 160 and the protection layer 170. In this way, stress at an interface between the doped semiconductor contact layer 160 and the protection layer 170 is further reduced, and a lattice match at the interface between the doped semiconductor contact layer 160 and the protection layer 170 is further increased.

The protection layer 170 is a single-layer structure or a multilayer structure.

In an embodiment, the material of the protection layer 170 is a P-type semiconductor protection layer, an N-type semiconductor protection layer or an intrinsic semiconductor layer. Specifically, when the semiconductor substrate layer 100 is a GaAs substrate, the material of the protection layer 170 is doped or undoped GaAs, or the material of the protection layer 170 is doped or undoped AlGaAs, or the material of the protection layer 170 is doped or undoped InGaP, or the material of the protection layer 170 is doped or undoped InGaAsP, or the material of the protection layer is doped or undoped InGaAs; when a material of the semiconductor substrate layer 100 is an InP substrate, the material of the protection layer 170 is doped or undoped InGaAsP, or the material of the protection layer 170 is doped or undoped InP, or the material of the protection layer is doped or undoped InGaAlAs, or the material of the protection layer is doped or undoped InGaAs, or the material of the protection layer is doped or undoped InAlAs; and when a material of the semiconductor substrate layer 100 is a GaN substrate, the material of the protection layer 170 is doped or undoped AlGaN, or the material of the protection layer 170 is doped or undoped GaN, or the material of the protection layer 170 is doped or undoped InAlGaN.

When the protection layer 170 is a multilayer structure, the protection layer 170 includes a first sub-protection layer to an $N^{th}$ sub-protection layer. A $(k+1)^{th}$ sub-protection layer is arranged on a side of a $k^{th}$ sub-protection layer away from the semiconductor substrate layer 100, where N is an integer greater than or equal to 2, and k is an integer greater than or equal to 1 and less than or equal to N.

In a specific embodiment, a conductivity type of the $(k+1)^{th}$ sub-protection layer is opposite to a conductivity type of the $k^{th}$ sub-protection layer, and a conductivity type of the first sub-protection layer is opposite to the conductivity type of the doped semiconductor contact layer. In an embodiment, the conductivity types of the first sub-protection layer to the $N^{th}$ sub-protection layer are all opposite to the conductivity type of the doped semiconductor contact layer.

In this embodiment, the front electrode layer 190 is further arranged on a side of the protection layer 170 away from the doped semiconductor contact layer 160; and the high-reliability low-defect semiconductor light-emitting device further includes: a current-limiting insulating layer 180, where the current-limiting insulating layer 180 is arranged between the front electrode layer 190 above the protection layer 170 and the protection layer 170. The material of the current-limiting insulating layer 180 includes silicon oxide.

Further, the doping concentration of the second conductive ions is $10^{-6}$ to $10^{-1}$ times the doping concentration of the first conductive ions, and is, for example, $10^{-6}$ times, $10^{-5}$ times, $10^{-4}$ times, $10^{-3}$ times, $10^{-2}$ times or $10^{-1}$ times. In this way, the protection layer 170 provides additional electrical insulation, so that the current in the edge area of the doped semiconductor contact layer 160 is limited by both the current-limiting insulating layer 180 and the protection layer 170.

Further, the current-limiting insulating layer 180 is arranged between the front electrode layer 190 above the protection layer 170 and the protection layer 170 and on a side of an edge of the first area away from the active layer 130. The current-limiting insulating layer 180 further covers an inner side wall of the protection layer 170. In addition, an area not covered by the current-limiting insulating layer 180 in the first area is used as a current injection area. The benefit lies in that when a current is injected into the current injection area, because the current injection area is at a certain distance from an interface between the protection layer 170 and the edge area of the doped semiconductor contact layer 160, in this way, it is difficult for an electric leakage path to be formed at the interface between the protection layer 170 and the edge area of the doped semiconductor contact layer 160.

When the current-limiting insulating layer 180 is further arranged on a side of an edge of the first area away from the active layer 130, the front electrode layer 190 further covers the current-limiting insulating layer 180 in the first area.

The width of an edge of the first area covered by the current-limiting insulating layer 180 refers to the width of any single side of the edge of the first area covered by the current-limiting insulating layer 180.

In this embodiment, the doped semiconductor contact layer 160 includes a first sub-doped semiconductor layer 161 and a second sub-doped semiconductor layer 162 arranged on a surface of the first sub-doped semiconductor layer 161 on a side away from the active layer 130, and a doping concentration of the second sub-doped semiconductor layer 162 is greater than a doping concentration of the first sub-doped semiconductor layer 161. Because the doping concentration of the second sub-doped semiconductor layer 162 is relatively high, the contact resistance between the second sub-doped semiconductor layer 162 and the front electrode layer 190 is reduced. Because the doping concentration of the first sub-doped semiconductor layer 161 is relatively low and the second sub-doped semiconductor layer 162 is far away from the active layer 130 compared with the first sub-doped semiconductor layer 161, the impact of the doped ions in the doped semiconductor contact layer 160 on absorption loss of light emitted by the active layer 130 is reduced.

In an embodiment, the doping concentration of the second sub-doped semiconductor layer 162 is 10 times to 50 times the doping concentration of the first sub-doped semiconductor layer 161. In this way, the contact resistance between the second sub-doped semiconductor layer 162 and the front electrode layer 190 is adequately reduced, and at the same time the impact of absorption loss of light is adequately reduced.

In other embodiments, the doped semiconductor contact layer may be a single-layer structure. The first area of the doped semiconductor contact layer is used for contacting the front electrode layer, thereby reducing the contact resistance.

The high-reliability low-defect semiconductor light-emitting device further includes: an upper waveguide layer 140 arranged between the doped semiconductor contact layer 160 and the active layer 130; an upper confining layer 150 arranged between the upper waveguide layer 140 and the doped semiconductor contact layer 160; a lower waveguide layer 120 arranged between the semiconductor substrate layer 100 and the active layer 130, and a lower confining layer 110 arranged between the lower waveguide layer 120 and the semiconductor substrate layer 100; and a back electrode layer 101 arranged on a surface of the semiconductor substrate layer 100 on a side away from the active layer 130.

In this embodiment, when the high-reliability low-defect semiconductor light-emitting device is soldered to a heat sink, the protection layer 170 increases the distance between solder and the active layer, to reduce the possibility that the solder bulges to cause of electric leakage, burnout, and failure of components, thereby improving the reliability of the semiconductor light-emitting device.

In this embodiment, the device further includes: an anti-reflective coating covering a front cavity surface, and a reflective coating covering a rear cavity surface.

Embodiment 2

This embodiment of the present application provides a method for manufacturing a high-reliability low-defect semiconductor light-emitting device, referring to FIG. 1. including:

S1: providing a semiconductor substrate layer;
S2: forming an active layer on the semiconductor substrate layer;
S3: forming a doped semiconductor contact layer on a side of the active layer away from the semiconductor substrate layer, where the doped semiconductor contact layer includes a first area and an edge area surrounding the first area;
S4: forming a protection layer on a side of the edge area of the doped semiconductor contact layer away from the active layer; and
S5: forming a front electrode layer on a side of the first area away from the active layer, where an upper surface of the front electrode layer in the first area is lower than an upper surface of the protection layer.

Figure 2:
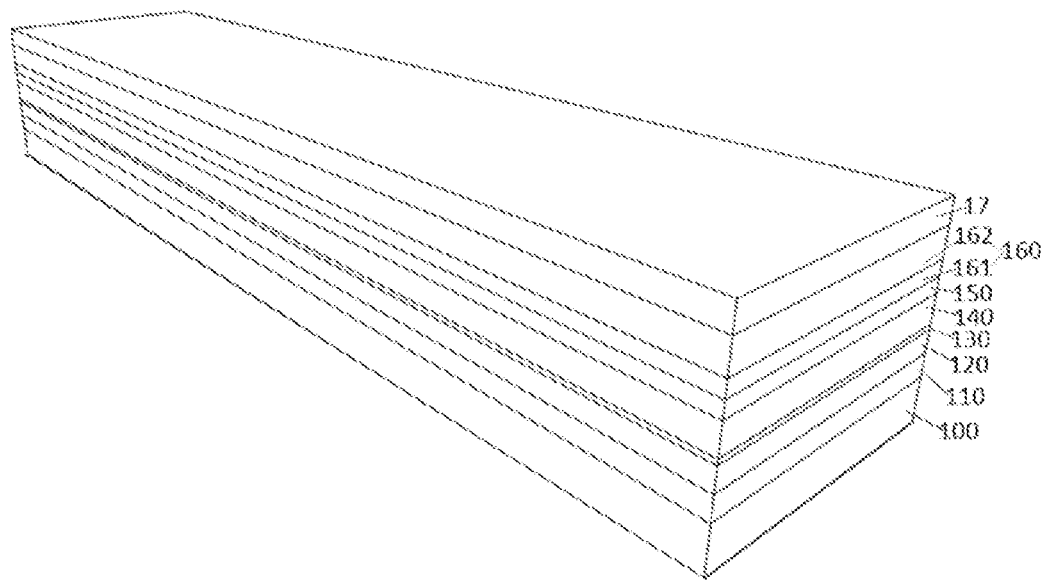
FIG. 2 to FIG. 6 are schematic diagrams of a process of manufacturing a high-reliability low-defect semiconductor light-emitting device according to another embodiment of the present application.

Referring to FIG. 2, a semiconductor substrate layer 100 is provided; a lower confining layer 110 is formed on the semiconductor substrate layer 100; a lower waveguide layer 120 is formed on a side of the lower confining layer 110 away from the semiconductor substrate layer 100; an active layer 130 is formed on a side of the lower waveguide layer 120 away from the semiconductor substrate layer 100; an upper waveguide layer 140 is formed on a side of the active layer 130 away from the semiconductor substrate layer 100; an upper confining layer 150 is formed on a side of the upper waveguide layer 140 away from the active layer 130; and a doped semiconductor contact layer 160 is formed on a side of the upper confining layer 150 away from the active layer 130.

In this embodiment, the step of forming a doped semiconductor contact layer 160 includes: forming a first sub-doped semiconductor layer 161 on the side of the active layer 130 away from the semiconductor substrate layer 100; and forming a second sub-doped semiconductor layer 162 on a surface of the first sub-doped semiconductor layer 161 on a side away from the active layer 130, where a doping concentration of the second sub-doped semiconductor layer 162 is greater than a doping concentration of the first sub-doped semiconductor layer 161. For the description of parameters of the first sub-doped semiconductor layer 161 and the second sub-doped semiconductor layer 162, reference is made to the foregoing embodiments.

In other embodiments, the doped semiconductor contact layer is a single-layer structure.

Figure 3:
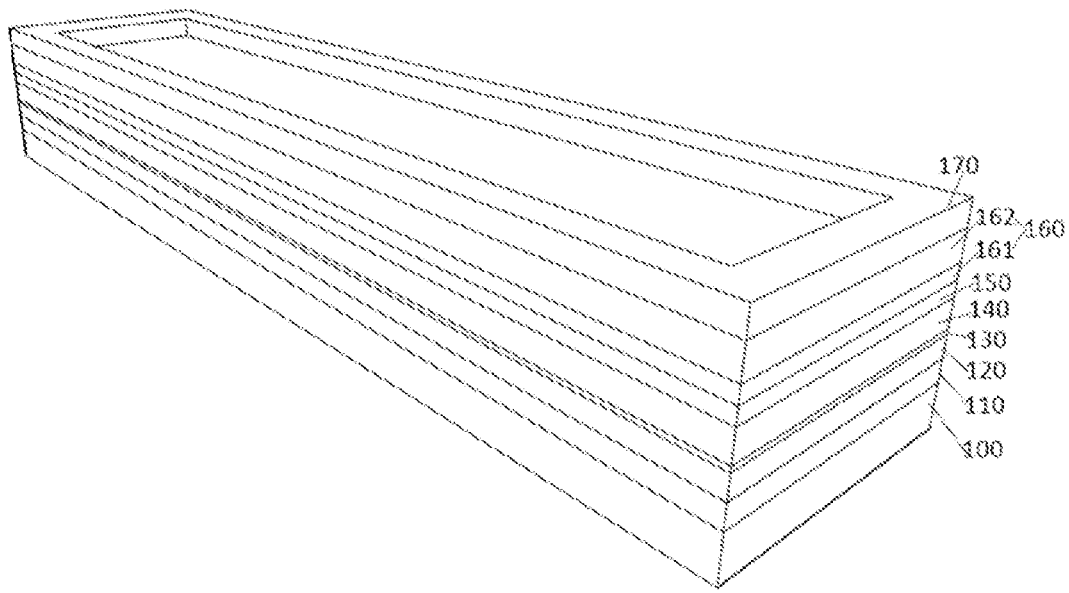

In step S4, the protection layer 170 is formed on the side of the edge area of the doped semiconductor contact layer away from the active layer. The step of forming a protection layer 170 includes: referring to FIG. 2, epitaxially growing an initial protection layer 17 on the side of the first area and the side of the edge area that are away from the active layer 130; and referring to FIG. 3, etching away a portion of the initial protection layer 17 in the first area to form the protection layer 170 that exposes a surface of the first area.

The initial protection layer 17 is a single-layer structure or a multilayer structure.

When the initial protection layer 17 is a multilayer structure, the initial protection layer 17 includes a first sub-initial protection layer to an NW sub-initial protection layer from bottom to top. The initial protection layer 17 in the first area is etched away, to make a kV sub-initial protection layer to form a $k^{th}$ sub-protection layer and a $(k+1)^{th}$ sub-initial protection layer to form a $(k+1)^{th}$ sub-protection layer.

In an embodiment, when the initial protection layer 17 is a multilayer structure, in the step of etching away a portion of the initial protection layer 17 in the first area, an etch selectivity of the material of the $(k+1)^{th}$ sub-initial protection layer with respect to the first sub-initial protection layer is greater than or equal to 5, for example, 5, 8, 10, 15 or 20, and an etch selectivity of the material of the first sub-initial protection layer with respect to the material of the doped semiconductor contact layer 160 is greater than or equal to 5, for example, 5, 8, 10, 15 or 20.

An etch selectivity of the material of the first sub-initial protection layer with respect to the material of the second sub-doped semiconductor layer 162 is greater than or equal to 5.

A process of forming the initial passivation layer includes a metalorganic chemical vapor deposition process (MOCVD) and a molecular beam epitaxy process (MBE).

In an embodiment, the doped semiconductor contact layer 160 and the initial protection layer 17 are sequentially formed in the same epitaxial process, so that the process is simplified. The doped semiconductor contact layer 160 and the initial protection layer 17 are continuously formed. In this way, the introduction of defects between the doped semiconductor contact layer 160 and the initial protection layer 17 is avoided, so that defects between the protection layer 170 and the edge area of the doped semiconductor contact layer 160 are reduced. In this way, the impact on carrier mobility is avoided, thereby preventing the resistance and voltage of the device from rising.

The doped semiconductor contact layer 160 and the initial protection layer 17 are continuously formed in the same chamber.

For the description of the specific parameters of the protection layer, reference is made to Embodiment 1. Details are not described again.

Figure 4:
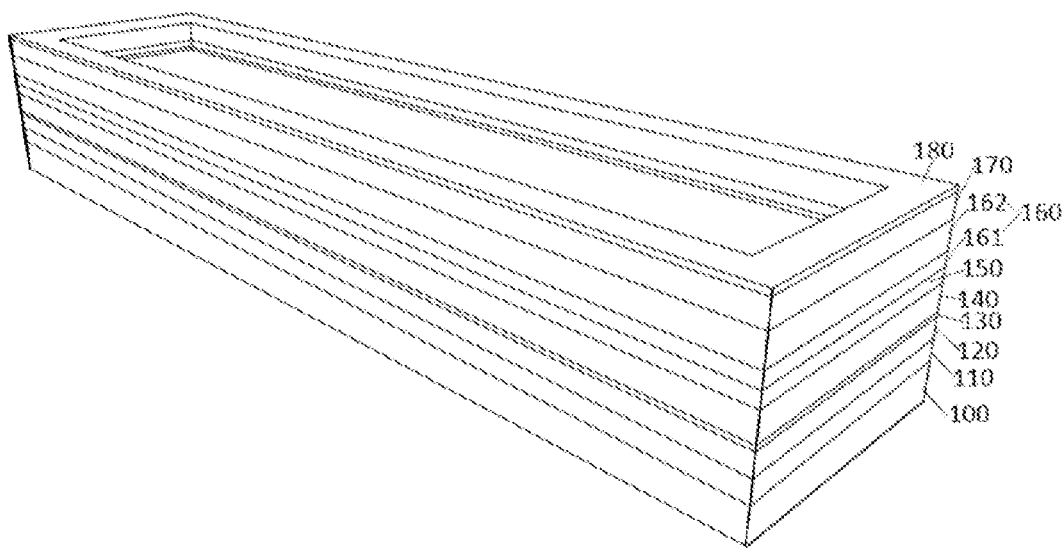

Referring to FIG. 4, the current-limiting insulating layer 180 is formed. The current-limiting insulating layer 180 is arranged on a side of the protection layer 170 away from the active layer 130. Further, the current-limiting insulating layer 180 is arranged on a side of the protection layer 170 away from the active layer 130, a side of an edge of the first area away from the active layer 130, and an inner side wall of the protection layer 170.

Figure 5:
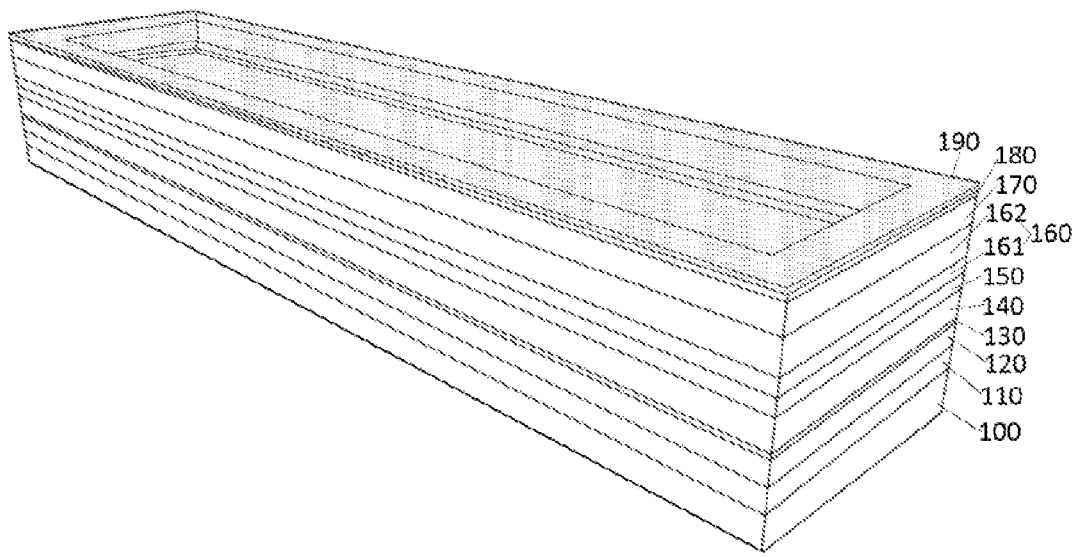

Referring to FIG. 5, a front electrode layer is formed on a side of the first area away from the active layer, where an upper surface of the front electrode layer in the first area is lower than an upper surface of the protection layer.

In the step of forming a front electrode layer, the front electrode layer is also formed on a side of the current-limiting insulating layer away from the protection layer.

In this embodiment, even if defects exist in the upper surface of the protection layer before the current-limiting insulating layer is formed and a lamination fault sheet is generated in a process of forming the current-limiting insulating layer on the protection layer, the electrical isolation of the protection layer can prevent the current-limiting insulating layer from breakdown due to increased charges, thereby keeping the semiconductor light-emitting device from reduced aging life or leakage and burnout.

Figure 6:
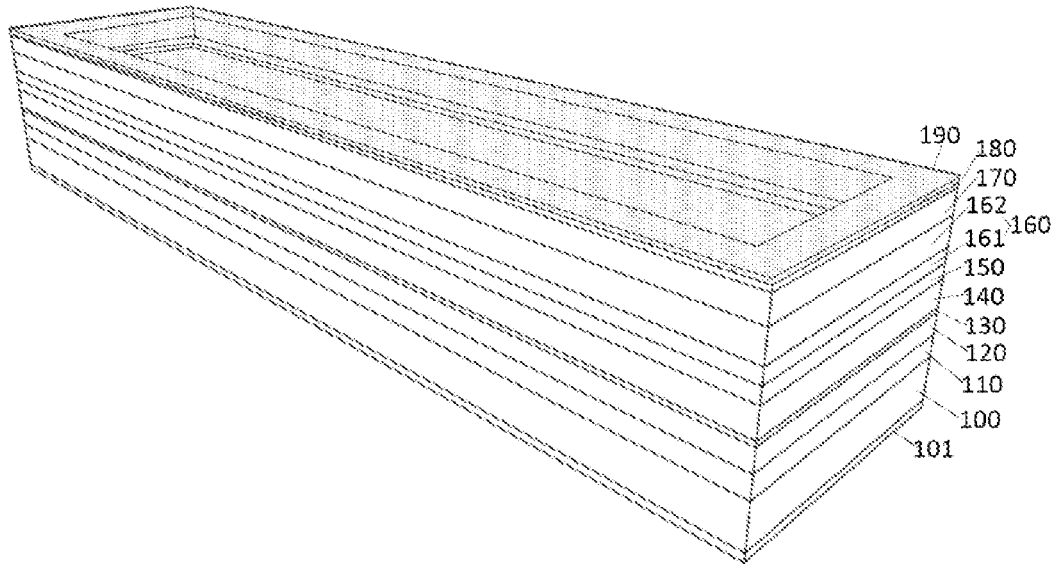

Referring to FIG. 6, a back electrode layer 101 is arranged on a surface of the semiconductor substrate layer 100 on a side away from the active layer 130.

In this embodiment, before the forming a front electrode layer, a plurality of first areas are provided, and cutting zones are provided between edge areas that surround different first areas; and the method for manufacturing a high-reliability low-defect semiconductor light-emitting device further includes: cleaving the front electrode layer, the current-limiting insulating layer, the protection layer, the doped semiconductor contact layer, the upper confining layer, the upper waveguide layer, the active layer, the lower waveguide layer, the lower confining layer, and the semiconductor substrate layer along the cutting zones.

In this embodiment, the method further includes: forming an anti-reflective coating on a front cavity surface, and forming a reflective coating on a rear cavity surface.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of present application.

The invention claimed is:

1. A high-reliability low-defect semiconductor light-emitting device, comprising:
a semiconductor substrate layer;
an active layer arranged on the semiconductor substrate layer;
a doped semiconductor contact layer arranged on a side of the active layer away from the semiconductor substrate layer, wherein the doped semiconductor contact layer comprises a first area and an edge area surrounding the first area;
a protection layer arranged on a side of the edge area of the doped semiconductor contact layer away from the active layer; and
a front electrode layer, arranged on a side of the first area away from the active layer, wherein an upper surface of the front electrode layer in the first area is lower than an upper surface of the protection layer,
wherein the protection layer completely surrounds the front electrode layer in the first area.

2. The high-reliability low-defect semiconductor light-emitting device according to claim 1, wherein a height difference between the upper surface of the protection layer and the upper surface of the front electrode layer arranged in the first area ranges from 0.05 μm to 5 μm.

3. The high-reliability low-defect semiconductor light-emitting device according to claim 1, wherein a thickness of the protection layer in a direction perpendicular to a surface of the semiconductor substrate layer ranges from 0.1 μm to 5 μm.

4. The high-reliability low-defect semiconductor light-emitting device according to claim 1, wherein the high-reliability low-defect semiconductor light-emitting device has a front cavity surface and a rear cavity surface that are disposed opposite, and both the front cavity surface and the rear cavity surface expose a sidewall surface of the active layer and a sidewall surface of the doped semiconductor contact layer; and the protection layer comprises a first sub-protection area and a second sub-protection area that are disposed oppositely, the first sub-protection area and the second sub-protection area are arranged along a light emission direction, an outer sidewall of the first sub-protection area is aligned with the sidewall surface of the active layer exposed from the front cavity surface and the sidewall surface of the doped semiconductor contact layer exposed from the front cavity surface, and an outer sidewall of the second sub-protection area is aligned with the sidewall surface of the active layer exposed from the rear cavity surface and the sidewall surface of the doped semiconductor contact layer exposed from the rear cavity surface.

5. The high-reliability low-defect semiconductor light-emitting device according to claim 1, wherein a material of the doped semiconductor contact layer is a first bulk semiconductor material doped with first conductive ions; and
a material of the protection layer is an undoped second bulk semiconductor material, or a material of the protection layer is a second bulk semiconductor material doped with second conductive ions, wherein a conductivity type of the second conductive ions is opposite to a conductivity type of the first conductive ions; or a material of the protection layer is a second bulk semiconductor material doped with second conductive ions, a conductivity type of the second conductive ions is the same as a conductivity type of the first conductive ions, and a doping concentration of the second conductive ions is less than a doping concentration of the first conductive ions.

6. The high-reliability low-defect semiconductor light-emitting device according to claim 5, wherein when the conductivity type of the second conductive ions is the same as the conductivity type of the first conductive ions, the doping concentration of the second conductive ions is $10^{-6}$ to $10^{-1}$ times the doping concentration of the first conductive ions.

7. The high-reliability low-defect semiconductor light-emitting device according to claim 5, wherein an average lattice mismatch between the second bulk semiconductor material and the first bulk semiconductor material is less than or equal to 1%.

8. The high-reliability low-defect semiconductor light-emitting device according to claim 7, wherein the second bulk semiconductor material is the same as the first bulk semiconductor material.

9. The high-reliability low-defect semiconductor light-emitting device according to claim 1, wherein the protection layer is a single-layer structure or a multilayer structure.

10. The high-reliability low-defect semiconductor light-emitting device according to claim 1, wherein when the semiconductor substrate layer is a GaAs substrate, the material of the protection layer is doped or undoped GaAs, or the material of the protection layer is doped or undoped AlGaAs, or the material of the protection layer is doped or undoped InGaP, or the material of the protection layer is doped or undoped InGaAsP, or the material of the protection layer is doped or undoped InGaAs;
when a material of the semiconductor substrate layer is an InP substrate, the material of the protection layer is doped or undoped InGaAsP, or the material of the protection layer is doped or undoped InGaAlAs, or the material of the protection layer is doped or undoped InGaAs, or the material of the protection layer is doped or undoped InAlAs, or the material of the protection layer is doped or undoped InP; and
when a material of the semiconductor substrate layer is a GaN substrate, the material of the protection layer is doped or undoped AlGaN, or the material of the protection layer is doped or undoped GaN, or the material of the protection layer is doped or undoped InAlGaN.

11. The high-reliability low-defect semiconductor light-emitting device according to claim 1, wherein the front electrode layer is further arranged on a side of the protection layer away from the doped semiconductor contact layer; and
the high-reliability low-defect semiconductor light-emitting device further comprises: a current-limiting insulating layer, wherein the current-limiting insulating layer is arranged between the front electrode layer above the protection layer and the protection layer and on a side of an edge of the first area away from the active layer.

12. The high-reliability low-defect semiconductor light-emitting device according to claim 1, wherein the doped semiconductor contact layer comprises a first sub-doped semiconductor layer and a second sub-doped semiconductor layer arranged on a surface of the first sub-doped semiconductor layer on a side away from the active layer, and a doping concentration of the second sub-doped semiconductor layer is greater than a doping concentration of the first sub-doped semiconductor layer.

13. The high-reliability low-defect semiconductor light-emitting device according to claim 12, wherein the doping concentration of the second sub-doped semiconductor layer is 10 times to 50 times the doping concentration of the first sub-doped semiconductor layer.

14. The high-reliability low-defect semiconductor light-emitting device according to claim 1, further comprising: an upper waveguide layer arranged between the doped semiconductor contact layer and the active layer; an upper confining layer arranged between the upper waveguide layer and the doped semiconductor contact layer; a lower waveguide layer arranged between the active layer and the semiconductor substrate layer, and a lower confining layer arranged between the lower waveguide layer and the semiconductor substrate layer; and a back electrode layer arranged on a surface of the semiconductor substrate layer on a side away from the active layer.

15. A method for manufacturing a high-reliability low-defect semiconductor light-emitting device, comprising:
providing a semiconductor substrate layer;
forming an active layer on the semiconductor substrate layer;
forming a doped semiconductor contact layer on a side of the active layer away from the semiconductor substrate layer, wherein the doped semiconductor contact layer comprises a first area and an edge area surrounding the first area;
forming a protection layer on a side of the edge area of the doped semiconductor contact layer away from the active layer; and
forming a front electrode layer on a side of the first area away from the active layer, wherein an upper surface of the front electrode layer in the first area is lower than an upper surface of the protection layer,
wherein the protection layer completely surrounds the front electrode layer in the first area.

16. The method for manufacturing a high-reliability low-defect semiconductor light-emitting device according to claim 15, wherein the step of forming a protection layer comprises: epitaxially growing an initial protection layer on the side of the first area and the side of the edge area that are away from the active layer; and etching away a portion of the initial protection layer in the first area to form the protection layer that exposes a surface of the first area.

17. The method for manufacturing a high-reliability low-defect semiconductor light-emitting device according to claim 16, wherein the doped semiconductor contact layer and the initial protection layer are sequentially formed in the same epitaxial process.

18. The method for manufacturing a high-reliability low-defect semiconductor light-emitting device according to claim 15, wherein before the forming a front electrode layer, a current-limiting insulating layer is formed, and the current-limiting insulating layer is arranged on a side of the protection layer away from the active layer and a side of an edge part of the first area; and in the step of forming a front electrode layer, the front electrode layer is also formed on a side of the current-limiting insulating layer away from the protection layer.

19. The method for manufacturing a high-reliability low-defect semiconductor light-emitting device according to claim 18, wherein before the forming a front electrode layer, a plurality of first areas are provided, and cutting zones are provided between edge areas that surround different first areas; and the method for manufacturing a high-reliability low-defect semiconductor light-emitting device further comprises: cleaving the front electrode layer, the current-limiting insulating layer, the protection layer, the doped semiconductor contact layer, the active layer, and the semiconductor substrate layer along the cutting zones.

20. The method for manufacturing a high-reliability low-defect semiconductor light-emitting device according to claim 15, wherein the step of forming a doped semiconductor contact layer comprises: forming a first sub-doped semiconductor layer on the side of the active layer away from the semiconductor substrate layer; and forming a second sub-doped semiconductor layer on a surface of the first sub-doped semiconductor layer on a side away from the active layer, wherein a doping concentration of the second sub-doped semiconductor layer is greater than a doping concentration of the first sub-doped semiconductor layer.

* * * * *